United States Patent [19]

Epstein et al.

[11] Patent Number: 5,286,206
[45] Date of Patent: Feb. 15, 1994

[54] CPR MANIKIN AND DISPOSABLE LUNG BAG

[75] Inventors: Herbert J. Epstein, Stanhope; John W. Reilly, New Vernon, both of N.J.; Richard A. Brault; Dianne B. Croteau, both of Toronto, Canada

[73] Assignee: Actar Airforce, Inc., Canada

[21] Appl. No.: 20,203

[22] Filed: Feb. 19, 1993

[51] Int. Cl.$^5$ ............................................. G09B 23/28
[52] U.S. Cl. .................................................. 434/265
[58] Field of Search ................................ 434/262, 265

[56] References Cited

U.S. PATENT DOCUMENTS

| | | |
|---|---|---|
| 3,562,924 | 2/1971 | Baermann et al. .................. 434/265 |
| 4,984,987 | 1/1991 | Brault et al. ......................... 434/265 |
| 5,055,052 | 10/1991 | Johnsen ................................. 434/265 |

Primary Examiner—John G. Weiss
Assistant Examiner—Jeffrey A. Smith
Attorney, Agent, or Firm—R. Gale Rhodes, Jr.

[57] ABSTRACT

CPR manikin in simulated human form including a head, body, arms and legs, the head is provided with throat and mouth openings in fluid communication and the body provided with a cavity, a piston is mounted in the cavity, a disposable lung bag is fastened over and in fluid communication with the throat opening and a body plate is mounted to the body and overlying the piston which provides biasing force to the body plate.

21 Claims, 6 Drawing Sheets

CPR MANIKIN AND DISPOSABLE LUNG BAG

BACKGROUND OF THE INVENTION

This invention relates to a CPR manikin for teaching cardio-pulmonary resuscitation (CPR) techniques including ventilation and/or external heart massage, and more particularly relates to a CPR manikin particularly useful in teaching the application of CPR techniques to infants. This invention also relates to the subcombination of a new and improved disposable lung bag for CPR manikins.

CPR manikins are commonly used in teaching cardiopulmonary resuscitation (CPR) in order that students can be taught the proper techniques of external heart massage and ventilation or mouth-to-mouth resuscitation without risking harm or injury to a live human being. To enhance the teaching of CPR it is desirable that the CPR manikin simulate the human form or appearance in order that the students can relate to prior experience in touching and handling live human beings and in order that the students will be relieved as much as possible of any apprehension with regard to the touching or handling of a mechanical CPR manikin while learning CPR techniques.

Prior art CPR manikins simulating the human form are typically complex and therefore expensive to manufacture causing the sales price to be so high that only a limited number can be afforded whereby the number available at any one time for student practice is limited. Such prior art manikins simulating the human form are disclosed, for example, in U.S. Pat. Nos. 4,331,426 and 4,611,998.

Accordingly, there exists a need in the CPR manikin art of a new and improved manikin simulating the human form which is relatively uncomplicated and inexpensive to manufacture.

Disposable lung bags are known to the art for use with a CPR manikin. Examples of such disposable lung bags are disclosed in U.S. Pat. Nos. 4,984,987 and 5,083,559; these patents also disclose, respectively, a CPR manikin and artificial respiration breathing device and these patents are hereby incorporated herein by reference as if fully reproduced herein. While these disposable lung bags have worked well, there still exists a need for a new and improved disposable lung bag configured for one or more of the following: for improved attachment to a CPR manikin, for being positioned with respect to the chest portion of the manikin to facilitate simulation of chest rise during ventilation and to simulate the presence of both the lungs and stomach of a person whereby upon air in excess of the amount for proper ventilation being introduced into the lung, the stomach is inflated to provide both visual and tactile indications of exercise ventilation.

SUMMARY OF THE INVENTION

It is the object of the present invention to satisfy the foregoing need in the CPR manikin art. A CPR manikin satisfying such need and embodying the present invention may include a simulated human form including a head, body, arms and legs, the head is provided with throat and mouth openings in fluid communication and the body is provided with a cavity in which a piston is mounted, a disposable lung bag is fastened over and in fluid communication with the throat opening, and a body plate is mounted to the body and overlies the piston whereby the piston provides biasing force to the body plate.

A disposable lung satisfying the foregoing need in the art and embodying the present invention may include one or more of the following features: a transverse portion of reduced size for being engaged or surrounded by a mounting member to facilitate mounting or fastening of the bag to a manikin, opposed open and closed ends providing a first chamber which simulates the lungs and a second chamber in fluid communication with the first chamber and which simulates the stomach, an opening for receiving a portion of a CPR piston to position the lung bag with respect to the chest portion of a manikin such that upon the bag being inflated and expanded during ventilation the expanded lung bag causes the chest portion to rise and provide visual and tactile indication of ventilation.

DESCRIPTION OF THE DRAWINGS

FIG. 11 is a plan view illustrating the removable head of the CPR manikin of the present invention mounted removably between the manikin legs to shorten the length of the manikin for more efficient storage, transportation and the like.

DESCRIPTION OF THE PREFERRED EMBODIMENT

Figure 1:
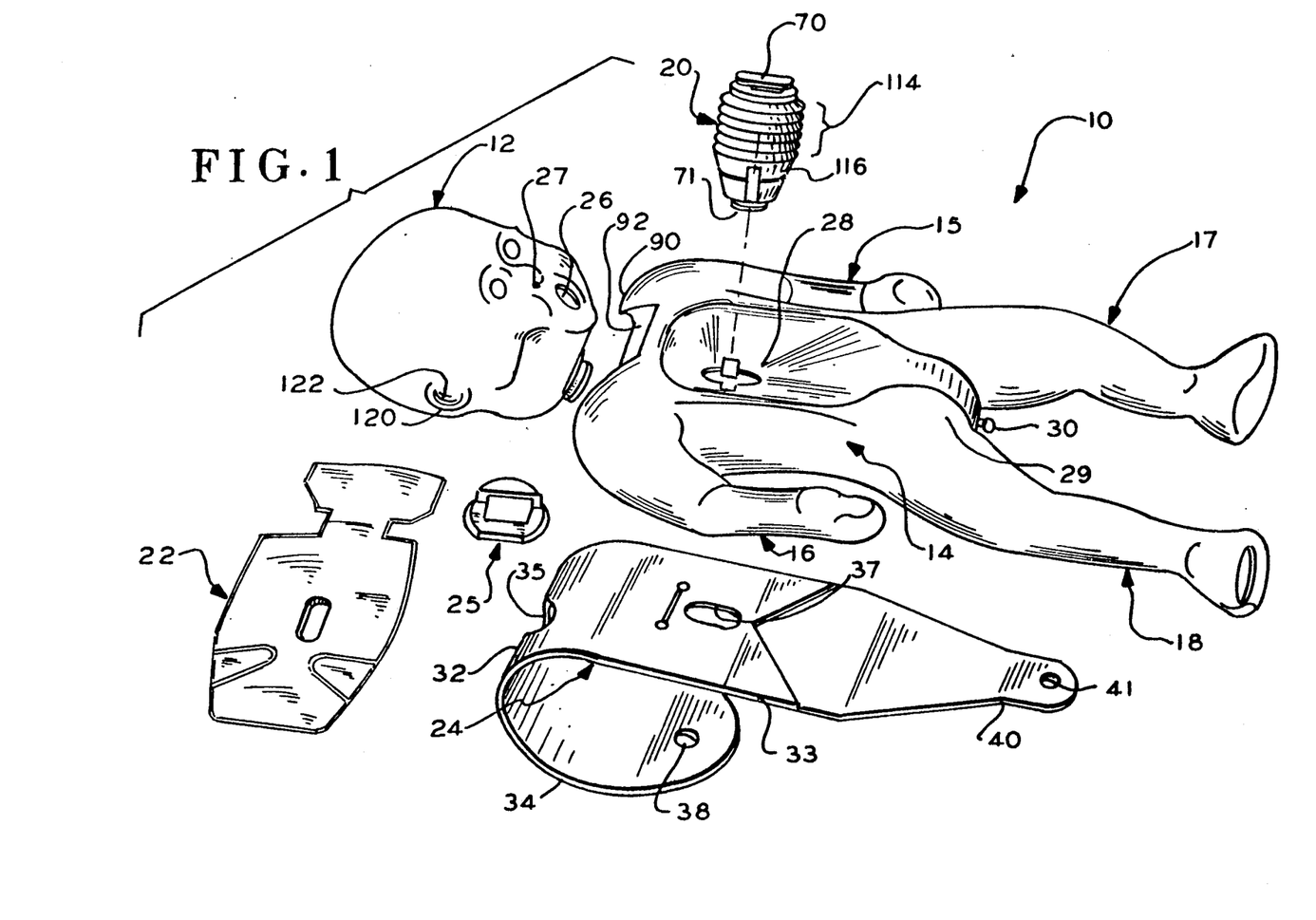
FIG. 1 shows the components of a CPR manikin embodying the present invention disassembled.
Figures 1A, 2, 3:
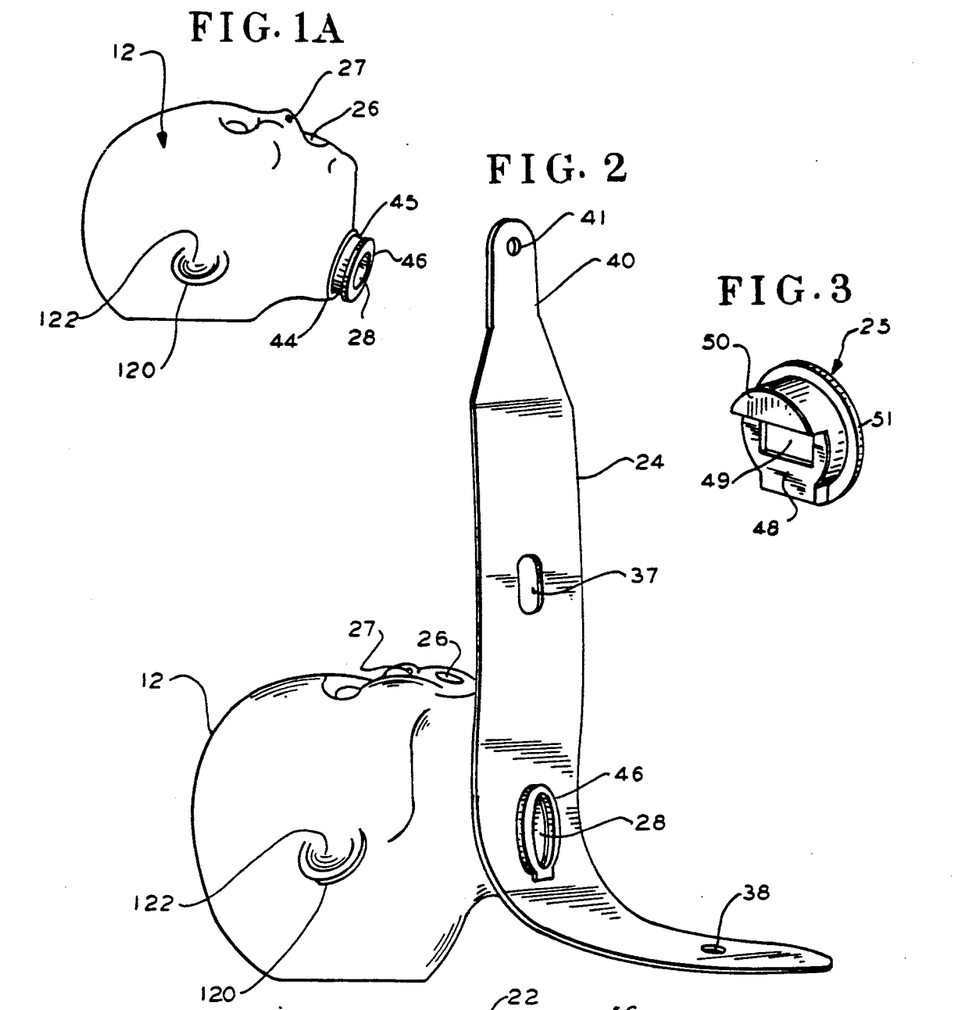
FIG. 1A is an enlarged perspective view of the head of FIG. 1.
FIG. 2 illustrates the mounting of the body plate to a head of a CPR manikin of the present invention.
FIG. 3 is a perspective view of an airway cap of the present invention.

Referring to FIG. 1, the components of an infant CPR manikin embodying the present invention and indicated by general numerical designation 10 are shown disassembled. The components, indicated by general numerical designations, include a head 12, torso or body 14, arms 15 and 16, legs 17 and 18, piston 20, disposable lung bag 22, body plate 24 and an airway cap 25. The head 12 is provided with a mouth opening 26, nostril opening or openings 27, and a throat opening 19; FIGS. 1A and 2, which openings are in fluid communication as it will be understood that the head 12 is hollow. The body 14 is provided with a cavity 28 in which the piston 20 is mounted and includes a groin portion 29 from which extends body plate mounting member or projection 30 including an enlarged outer portion as shown. The body plate 24 includes a shoulder portion 32, a chest plate 33 and a back plate 34. A neck opening 35 is provided in the shoulder portion 32 and opposed piston mounting openings 37 and 38 are provided respectively in the chest and back plates 33 and 34. The body plate 24 further includes a groin portion 40 provided with a mounting opening 41. The head 12, FIG. 1A, includes a neck portion 44 provided with a groove 45 and a flange 46.

In assembly, and referring to FIGS. 1, 1A, and 2, the neck portion 44 of the head 12 is inserted through the neck opening 35 provided in the shoulder portion 32 of the body plate 24 to cause the portion of the body plate surrounding the neck opening 35 to reside in the neck groove 45 and to cause the flange 46 to reside underneath the shoulder portion of the body plate as shown in FIG. 2. This mounts the head 12 to the body plate 24 or, viewed alternatively, mounts the body plate to the head.

Figure 9:
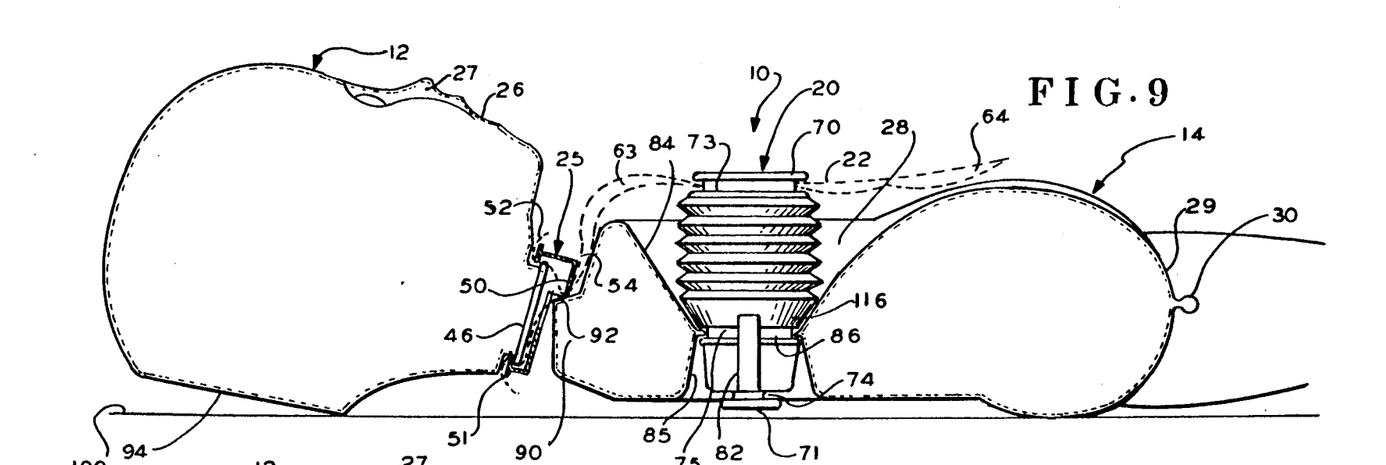
FIGS. 9 and 10 are partial diagrammatical vertical cross-sectional views of the CPR manikin of the present invention taken generally along the line 9—9 in FIG. 8 in the direction of the arrows with the body plate not being shown for clarity of understanding of the components that are shown, these figures illustrate, respectively, the closing and opening of the airway in connection with the teaching of the backward tilting of the manikin head in the application of proper CPR ventilation technique.
Figure 10:
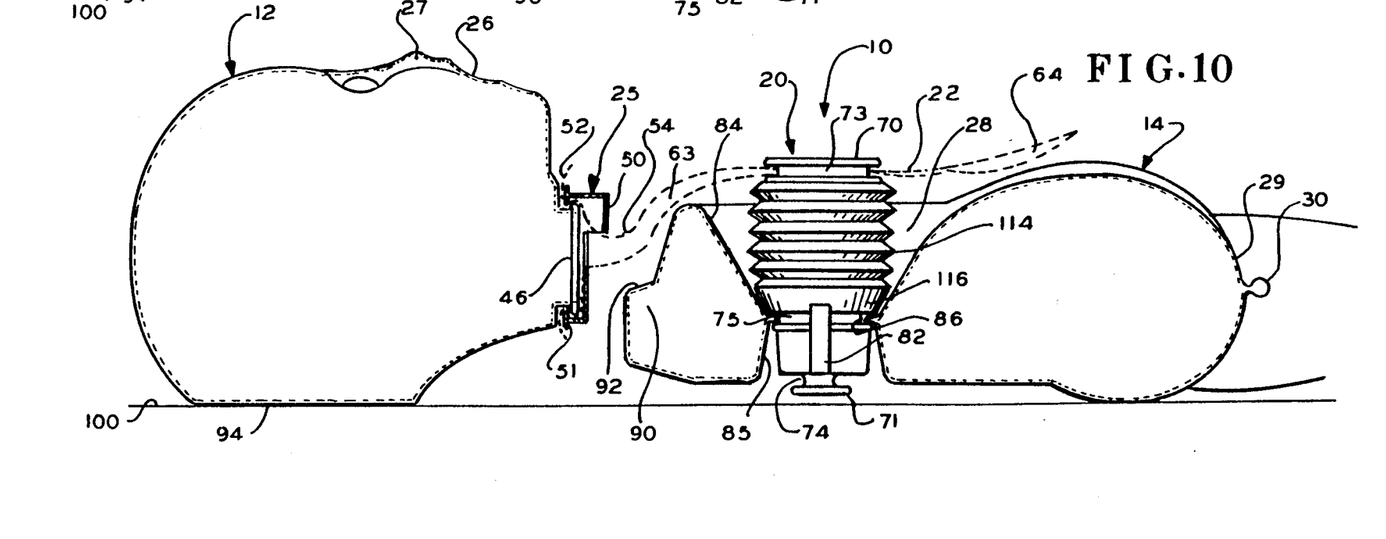

Referring to FIG. 3, the airway cap 25 is shown in greater detail and is of generally annular shape or configuration including a transverse portion 48 provided with an opening 49, an outwardly extending member 50 of generally semi-circular shape and a circular flange 51 which is shown in cross-section in FIGS. 9 and 10.

Figure 4:
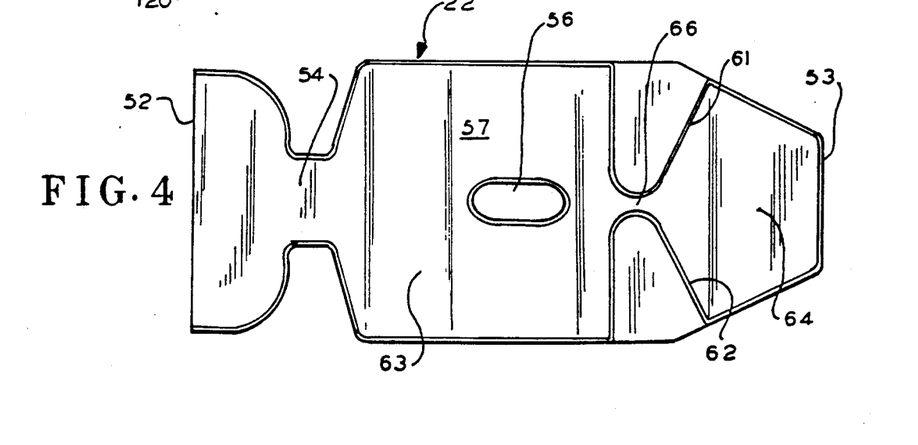
FIG. 4 is a top plan view of a disposable lung bag of the present invention.

The disposable lung 22, FIG. 4, includes opposed open and closed ends 52 and 53, an intermediate transverse portion 54 of reduced size, and a generally centrally formed piston mounting opening or hole 56. It will be understood that the disposable lung 22 is an inflatable bag, made for example of a suitable plastic such as polyethylene film, and it includes opposed layers, only the top layer 57 and is shown but it will be understood that a bottom layer is opposite to and of the same shape as the layer 57. The bag 22 may be made by being cut from two layers of, for example, the above-noted polyethylene film and sealed along the outer edges except for the open end 52 and along the edges defining the opening 56. Alternatively, the bag may be made from a single layer of such film, folded over, and sealed generally as stated above with regard to the two layer example. The opposed layers 57 and 58 may be further suitably sealed along the sealing lines 61 and 62, such as for example by suitable heat sealing in the manner known to the art and sometimes referred to as bar sealing, to provide a lung chamber 63 proximate or integral with the open end 52 and a stomach chamber 64 proximate or integral with the closed end 53. The stomach and lung chambers are in fluid communication due to the unsealed portion or fluid or air pathway 66.

Figure 5:
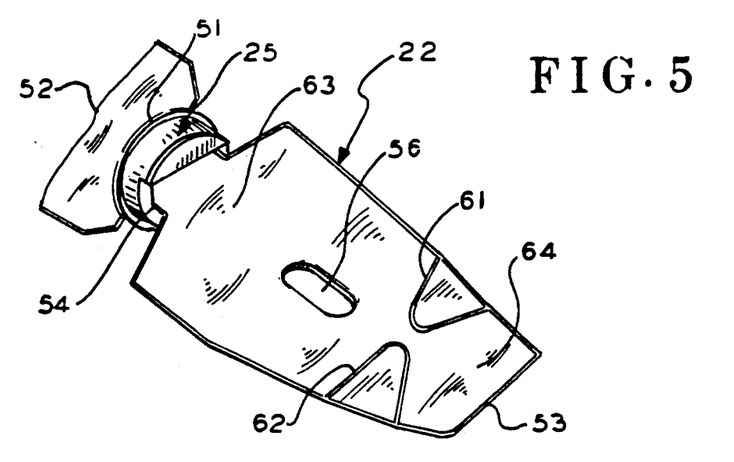
FIG. 5 is a perspective view which illustrates the engagement of the airway cap and disposable lung of the present invention.
Figure 6:
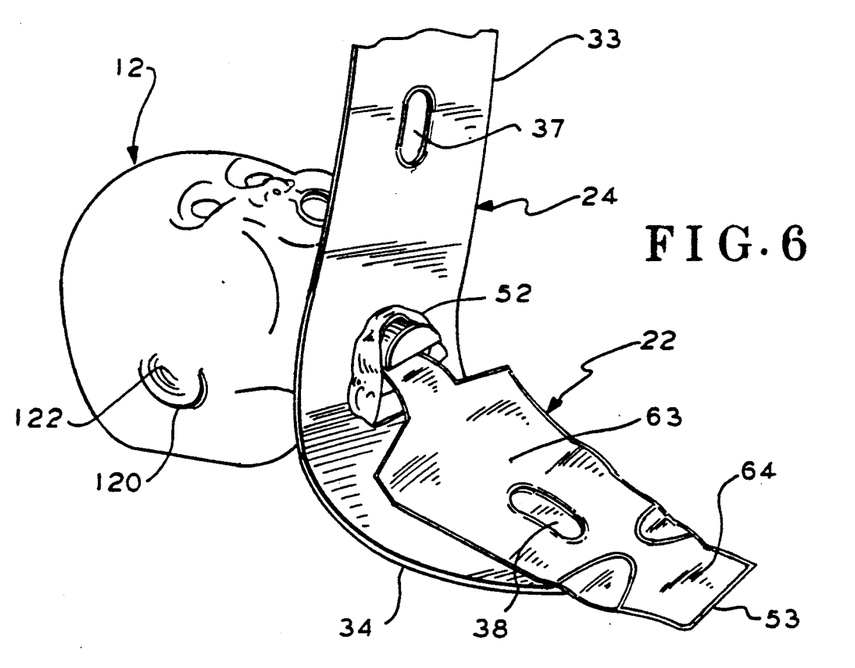
FIG. 6 is a perspective view which illustrates the mounting of the disposable lung to the neck portion of the manikin head of the present invention.

In further assembly, and as illustrated in FIGS. 5 and 6, the open end 52 of the disposable lung bag 22 is inserted through the opening 49 (FIG. 3) of the airway cap 25 to cause the airway cap to surround or engage the transverse portion 54 (FIG. 4) of reduced size of the lung bag. Thereafter, the flange portion 51 of the airway cap 25, note FIGS. 9 and 10, is forced over the neck flange 46 to removably fasten the open end 52 of the disposable lung bag 22 to or over the neck portion 44, FIG. 1A, of the head 12 and thereby provide the subassembly shown in FIG. 6.

Figure 7:
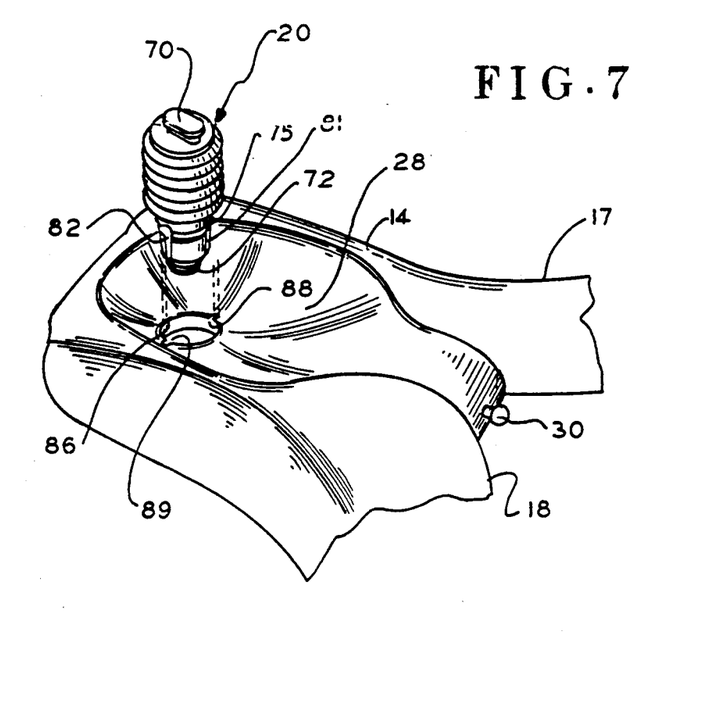
FIG. 7 is a diagrammatical perspective view illustrating the mounting and orientation of the piston to the body of the CPR manikin of the present invention.

The piston 20, FIG. 1, includes top and bottom mounting members, projections or flanges, 70 and 71 which provide top and bottom mounting grooves or undercut portions 73 and 74, note FIGS. 9 and 10, and is further provided with a mounting groove 75 intermediate the top and bottom flanges 70 and 71. It will be particularly noted from FIGS. 1 and 7 that the top mounting flange 70 is oblong having longer and shorter dimensions as shown. As noted above, the present invention is disclosed embodied as the infant CPR manikin 10, accordingly, it will be understood that the oblong flange 70 simulates the portion or segment of the sternum of an infant to which compressive loads are applied in performing the heart massage CPR technique. Thus, it will be understood that the longer dimension of the flange 70 must extend lengthwise of the manikin body 14 and hence the piston 20 must be mounted to the body 14, and oriented with respect thereto, such that the longer dimension of the flange 70 extends lengthwise of the body 14. Accordingly it will be noted that the piston 20 is provided with a pair of opposed outwardly extending ribs or ridges 81 and 82 extending substantially transverse with respect to the longer dimension of the flange 70; this is best seen in FIG. 7. With further regard to such required orientation of the piston 20 with respect to the body 14, the cavity 28 provided in the body 14 is, in the preferred embodiment, embodied as a hole extending through the body 14 and is defined by opposed inwardly extending tapered portions 84 and 85 better seen in FIGS. 9 and 10. Such inwardly tapered portions combine to provide an inwardly extending ridge 86 which is generally circular as may be understood from FIG. 7 and which includes a pair of opposed outwardly extending portions 88 and 89. The piston 20, FIG. 7, is mounted removably to the body 14 by orienting or rotating the piston 20 to align the outwardly extending ridges or ribs 81 and 82 provided on the lower conical portion of the piston with the outwardly extending portions 88 and 89 of the internal ridge 86 and by forcing the ridge 86 into the piston groove 75, note FIGS. 9 and 10. This mounting orients the longer dimension of the oblong flange 70 with respect to the lengthwise dimension of the body 14 as may be understood from FIGS. 7 and 8.

With further regard to assembly of the components of the CPR manikin 10 of the present invention, the subassembly shown in FIG. 6 is placed over the upper portion of the body 12 having the piston mounted therein as described above, and the top piston flange 70 is inserted through the opening 38 formed in the disposable lung bag 22, FIG. 6, and the top piston flange 70 is also inserted through the opening 37 formed in the chest plate 33, FIG. 6, to cause the portion of the chest plate surrounding the opening 37 to reside in the groove 73 and under the top flange 70 of the piston. The bottom piston flange 71 of the piston 20 is inserted through the opening 38, FIG. 6, formed in the back plate 34 and the portion of the back plate surrounding the opening 38 resides in the groove 74 and under the flange 71. This mounts the head 12 and body plate 24 to in the groove 74 and under the piston 20 and thereby to the body 14. To further mount the body plate 24 to the body 14, and therewith the head 12, the projection 30 extending outwardly from the groin region 29 of the body 14, FIG. 1, is inserted through the opening 41 formed in the groin portion 40 of the body plate 24.

Figure 8:
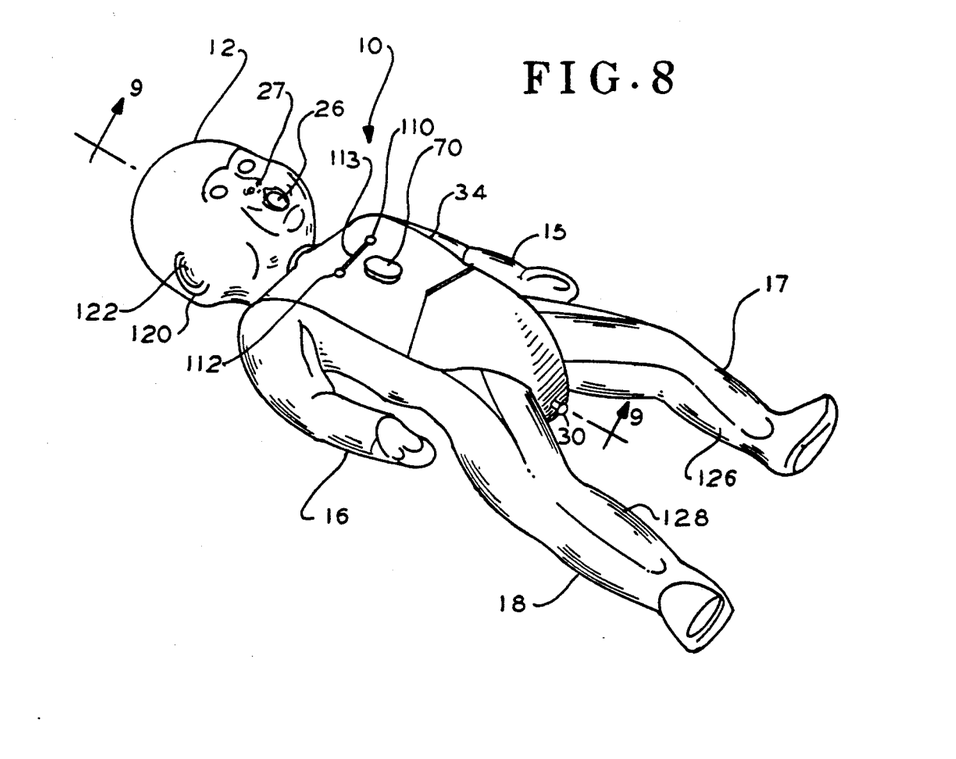
FIG. 8 illustrates the components of a CPR manikin of the present invention assembled.

Upon the assembly of the components as described above, the components of the CPR manikin 10 shown disassembled in FIG. 1 are assembled into the CPR manikin 10 of the present invention as illustrated in FIG. 8.

To teach the correct or proper application of the ventilation technique of CPR wherein the airway of the victim from the mouth to the lungs must be cleared or opened by tilting the victim's head back, it will be understood generally that the airway cap 25 in combination with the shoulder portion 90 (note particularly FIGS. 1 and 10) provide in combination a valve or airway cut-off which must be opened before air can be forced through the mouth opening 26 and throat opening 46 into the lung bag 22. More particularly, it will be noted from FIGS. 1 and 10 that the shoulder portion 90 of the body 14 is provided with an inclined flat surface 92 and that the intermediate transverse portion 54, FIGS. 4, 9 and 10, resides between the flat surface 92 and the outwardly extending member 50 of the airway cap 25. It will be further noted from FIG. 9 that the back of the head 12 is provided with a flat or flat surface 94 and it will be understood that the body plate 24, particularly the curved shoulder portion 32, FIG. 1, biases the head 12 into a forward tilt as shown in FIG. 9 and resiliently resists the backward tilt of the head to seat the head flat 94, FIG. 9, on a flat support surface 100 as shown in FIG. 10. Normally, as shown in FIG. 9, such biasing of the head 12 into a forward tilt causes the outwardly extending member 50 of the airway cap 25 to force the transverse portion of reduced size 54 of the lung bag 22 into engagement with the flat surface 92 of the shoulder portion 90 of the body 14 to constrict the transverse intermediate portion 54 of the lung bag 22 and thereby cut off the airway from the mouth and throat openings 26 and 46 into the lung bag 22. This constriction continues until the head 12 is tilted backwards to place the flat 94 into engagement with the support surface 100, as shown in FIG. 10, whereupon the outwardly extending member 50 of the airway cap 25 is moved or pivoted away from the flat surface 92 of the body shoulder 90 to unconstrict and open the transverse portion of reduced size 54 of the lung bag 22 whereupon air may be forced or blown into the mouth opening 26, through the throat opening 46, and into the lung bag 22 to demonstrate the CPR ventilation technique. Although the body plate 14, FIG. 1, is not shown in FIGS. 9 and 10 for clarity of presentation of the other components shown therein, it will be understood that upon the lung bag 22 being inflated it will impart force to the overlying chest plate, FIG. 8, of the body plate 24, to cause the chest plate 33 to rise thereby providing a visual and tactile indication that ventilation has occurred.

It will be further understood that in the infant CPR embodiment of the present invention the lung chamber 63, FIG. 10, is dimensioned or made of a size to simulate the typical lung capacity of an infant. Accordingly, in the event that air in excess of the amount for proper ventilation of an infant is introduced into the lung bag 22, excess air from the lung chamber 63 flows into the stomach chamber 64 through the fluid pathway 66 (FIG. 4) to inflate the stomach chamber 64, FIG. 10, which imparts force to the overlying portion of the chest plate 33 causing the overlying portion to rise and thereby provide both a visual and tactile indication that excessive air has been forced into the lungs of a simulated infant.

With regard to the application of the external heart massage technique of CPR, the CPR manikin of the present invention upon being embodied as an infant CPR manikin may be provided with what are sometimes referred to in the art as "landmarks" for the proper positioning of the fingers of a person practicing infant external heart massage. Such landmarks in the present invention may be embodied as simulated nipples 110 and 112, as shown in FIG. 8, and intermammary line 113 may be provided extending therebetween as is also shown in FIG. 8. For proper infant external heart massage, the index finger of the hand of the student may be placed along the intermammary line 113, to the right thereof, which will position the index and ring fingers of the student over the top portion of the flange 70 of the piston 20 whereby the appropriate or correct application of external heart massage for an infant may be practiced by using such index and ring fingers to apply and remove compressive loads to the piston 20. It will be further understood that the piston 20, note FIG. 1, is provided with a bellows portion 114 and a rigid wall portion 116. In the preferred embodiment of the infant CPR manikin of the present invention, the bellows portion 114 of the piston 20 is made or configured to simulate realistic chest compressions of an infant by having a substantially maximum compression depth of about 1" (2.5 cm). Upon compressive loads in excess of the amount for proper infant heart massage being applied to the piston 20, the rigid wall portion 116 of the piston 20 resists deformation, i.e. further deformation, of the piston 20 and provides a tactile indication that excessive compressive loads have been applied. The rigidity of the rigid wall portion 116 of the piston 20 may be further enhanced by making the conical shape of the rigid wall portion 116 complementary with the conical shape of the inwardly tapered portion 84 of the body cavity 28 as illustrated in FIGS. 9 and 10.

Figure 11:
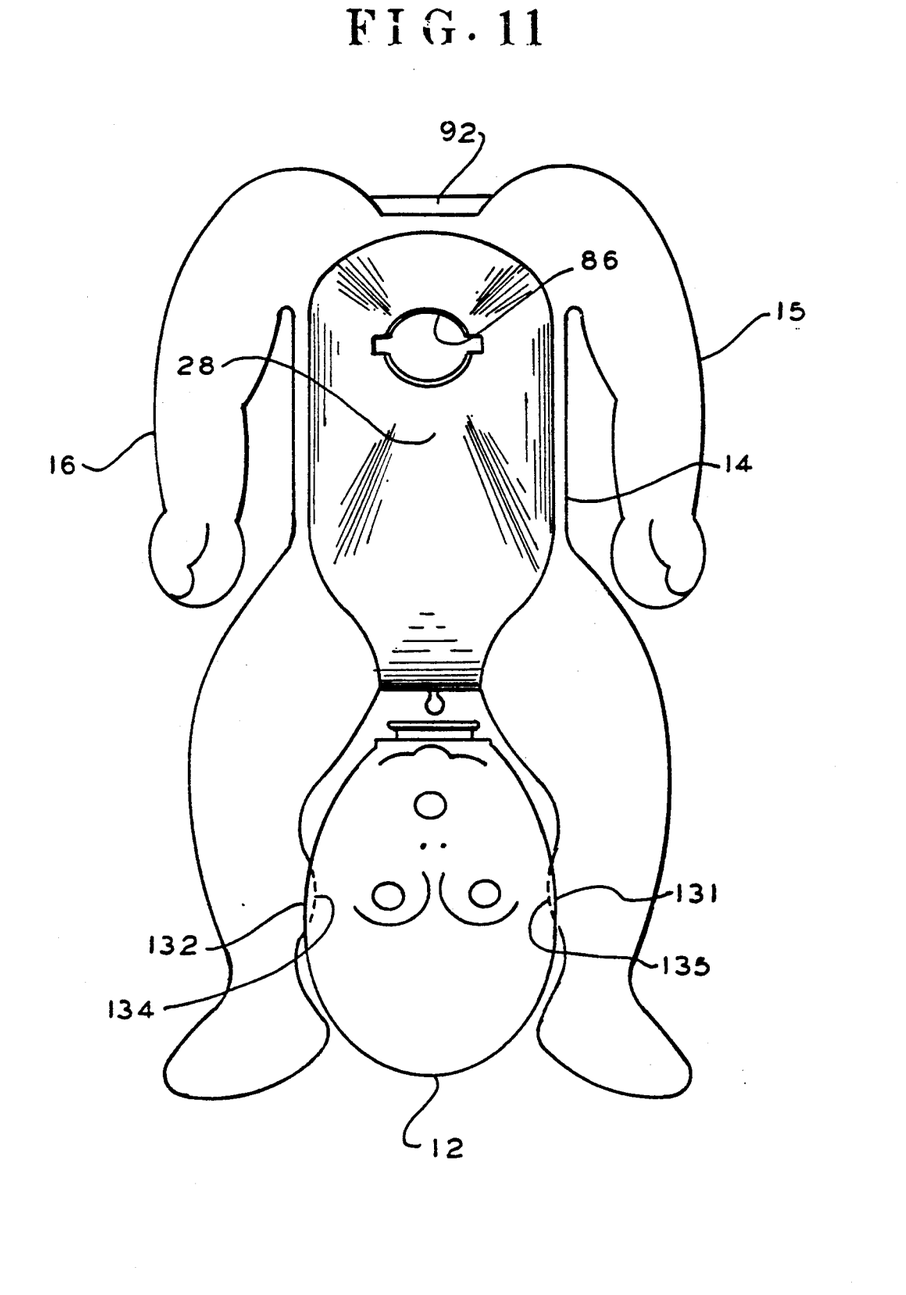

Referring again to the assembled CPR manikin 10 shown in FIG. 8, it will be understood that upon the components being assembled into the CPR manikin the manikin will have a given length. It will be further understood that containers for storing and shipping of such manikin must be sufficiently large to accommodate the assembled manikin if shipped or stored as shown in FIG. 8. It is, of course, generally understood that the larger the container the higher its cost and the smaller the container the lower its cost. The head 12 of the CPR manikin 10 of the present invention may be removed and mounted, removably, between the legs 17 and 18 for temporary storage as illustrated in FIG. 11. Such removable mounting of the head 12 may be accomplished by providing ears on the opposite sides of the head, note particularly FIG. 8, which ears provide depressions for wedgedly receiving the inwardly extending portions 126 and 128 of the legs 17 and 18 this is indicated by the overlying solid and dashed lines 131, 132, 134 and 135 shown in FIG. 11. Only one ear 120 is shown in FIG. 8 which provides depression 122, but it will be understood that another ear and depression are provided on the opposite side of the head.

It will be understood that all steps of Lay Person Infant CPR as described by the 1992 American Heart Association Guidelines can be practiced with the CPR manikin 10 of the present invention, particularly as shown in FIG. 8. It will be further understood that the positioning of the head flat 94 as shown in FIG. 10 to open the airway as described above demonstrates the correct positioning of such airway, e.g., the sniffing position, as described by the American Heart Association 1992 Guidelines for CPR.

The head 12 and body 14 may be made by suitable molding, such as blow molding, and such components may be made, for example, of polyethylene. The piston 20 may be made in many different ways known to the art and with many different materials and, for example, may be made of polypropylene by blow molding. The body plate 24 may be made in many different ways known to the art, such as for example by compression molding, and may be made of polyethylene foam. It will be understood that the body plate 12 may be conveniently made in a flat shape of flexible and resilient material to permit the body plate to be curved into the generally U-shaped configuration or shape shown in FIG. 1. The airway cap 25 may also be made in many different ways, such as by injection molding, and may be made for example of polyethylene.

While the CPR manikin 10 disclosed in the above specification and shown in the drawing shows the present invention embodied as an infant CPR manikin, it will be understood that such embodiment is merely exemplary of the present invention and it will be understood that by merely scaling up to make the components larger a manikin embodying the present invention may be made embodied as a child CPR manikin and an adult CPR manikin.

It will be understood by those skilled in the art that many variations and modifications may be made in the present invention without departing from the spirit and the scope thereof.

What is claimed is:

1. A CPR manikin for teaching cardio-pulmonary resuscitation techniques including ventilation and external heart massage, comprising in combination:
   a simulated human form including a head, body, arms and legs, said head provided with throat and mouth openings in fluid communication, said body provided with a hole extending therethrough, and said hole defined by opposed inwardly extending tapered portions providing in combination an inwardly extending internal ridge;
   a piston mounted in said cavity, said piston including top and bottom portions and a groove formed intermediate said top and bottom portions for wedgedly receiving said internal ridge to mount said piston in said hole and thereby to mount said piston to said body;
   a lung bag fastened over and in fluid communication with said throat opening;
   a body plate mounted to said head and said body plate overlying said piston and said lung bag; and
   said lung bag inflatable for teaching said ventilation technique and said piston providing biasing force to said body plate for teaching said heart massage technique.

2. The CPR manikin according to claim 1 wherein said body has a length, wherein said top portion of said piston is oblong simulating the sternum of an infant and includes longer and shorter dimensions, and wherein said internal ridge and said bottom portion of said piston are provided with complementary shapes to orient said longer dimension of said top portion of said piston along said length of said body upon said piston being mounted to said body.

3. The CPR manikin according to claim 1 wherein said body has a lengthwise dimension, and wherein said top and bottom portions of said piston include top and bottom flanges for mounting said body plate to said piston, said top flange simulating the sternum of an infant and being oblong and including longer and shorter dimensions, wherein said bottom portion of said piston is further provided with outwardly extending ridges transverse to the said longer dimension of said oblong top flange, wherein said inwardly extending internal ridge is provided with opposed outwardly extending portions transverse to said lengthwise dimension of said body and for receiving said ridges provided on said piston, upon said ridges provided on said piston residing in said outwardly extending portions of said internal ridge said piston being mounted to said body with said longer dimension of said oblong top flange aligned with the lengthwise dimension of said body.

4. The CPR manikin according to claim 1 wherein said body plate includes a curved shoulder portion provided with a neck opening, wherein said head is provided with an outwardly extending neck portion in which said throat opening is formed and said neck portion provided with a groove and flange, said neck portion for extending through said neck opening formed in said shoulder portion to cause a portion of said shoulder portion surrounding said neck opening to reside in said groove and to cause said flange to reside under said shoulder portion to fasten said head and shoulder portion together and thereby to fasten said head to said body plate.

5. The CPR manikin according to claim 4 wherein said body plate further includes chest and back plates provided with opposed piston openings, wherein said top and bottom portions of said piston are provided with top and bottom flanges and wherein the portions of said chest and back plates surrounding said opposed piston openings are received under said flanges to fasten said chest and back plates to said piston and thereby to fasten said body plate to said body.

6. CPR manikin according to claim 5 wherein said body plate includes a groin portion provided with first mounting means and wherein said body includes a groin portion provided with second mounting means, said first and second mounting means for being engaged to fasten the groin portion of said body plate to the groin portion of said body to further fasten said body plate and said head to said body.

7. The CPR manikin according to claim 6 wherein said first mounting means comprises an opening and wherein said second mounting mean comprises a projection including an enlarged outer portion for being fitted into said opening.

8. The CPR manikin according to claim 5 wherein said disposable lung bag comprises an inflatable bag and is provided with an opening extending therethrough for receiving said top portion of said piston to mount said inflatable bag intermediate said chest plate and said body, upon air being forced into said lung bag during teaching of said ventilation technique said lung bag being inflated and imparting force to said chest plate to cause said chest plate to rise and provide visual and tactile indications of said ventilation technique.

9. The CPR manikin according to claim 5 wherein said chest plate is provided with indicia for facilitating the proper placement of a person's hand on said chest plate to facilitate the teaching of the application of compressive loads to said manikin at the correct body location during said teaching of said heart massage technique.

10. The CPR manikin according to claim 9 wherein said indicia comprise simulated human nipples having an intermammary line running therebetween and along which line a person may place their index finger to properly position their index and ring finger over said piston for the application of said compressive loads to said piston and thereby to said manikin at said correct body location.

11. The CPR manikin according to claim 1 wherein said head includes a rear portion provided with a flat for seating said head on a support surface when said head is tilted backwards during teaching of said ventilation technique and wherein said body plate biases said head into a forward tilt and resiliently resists said backward tilt and normally maintains said head in said forward tilt.

12. The CPR manikin according to claim 11 wherein said head is provided with an outwardly extending neck portion in which said throat opening is formed, and wherein said CPR manikin further comprises combination mounting and valve means for mounting said disposable lung bag removably over said neck portion and for providing an airway cut-off in combination with a shoulder portion of said body to constrict a portion of said lung bag and impede the flow of air through said mouth and said throat openings into said lung bag while said head is biased into said forward tilt, and upon said head being tilted backwards to place said flat in engagement with said support surface said combination mounting and valve means being moved away from said shoulder portion of said body to unconstrict said portion of said disposable lung bag and to permit air to flow through said mouth and said throat opening into said lung bag.

13. The CPR manikin according to claim 12 wherein said combination mounting and valve means comprising a generally annular member provided including a transverse portion provided with an opening for receiving said portion of said disposable lung bag and including an outwardly extending member for engaging and forcing said portion of said bag into engagement with said shoulder portion of said body to constrict said first portion of said lung bag.

14. The CPR manikin according to claim 13 wherein said disposable lung bag comprises an inflatable bag having opposed open and closed ends and including a transverse portion of reduced size comprising said portion of said disposable lung bag received within said opening provided in said annular member.

15. The CPR manikin according to claim 1 wherein said disposable lung bag comprises an inflatable bag having opposed open and closed ends and providing two chambers in fluid communication, said first chamber proximate said open end and said second chamber proximate said closed end and wherein said first chamber simulates the lungs of a person and wherein said second chamber simulates the stomach of a person.

16. The CPR manikin according to claim 15 wherein said first chamber is integral with said open end and wherein said second chamber is integral with said closed end.

17. The CPR manikin according to claim 1 wherein said piston includes a bellows portion for resiliently deforming and reforming under the application and release of compressive loads applied to and removed from said manikin during said teaching of said heart massage technique and said piston further including a rigid wall portion for resisting deformation upon compressive loads in excess of the amount for proper heart massage being applied to the piston to provide a tactile indication that excessive compressive loads have been applied.

18. The CPR manikin according to claim 1 wherein said head is removable from said body and wherein said legs and said head are provided with complementary shaped portions for being engaged thereby enabling said head to be mounted removably between said legs to reduce the length of said manikin to permit said manikin to be stored in a smaller container.

19. The CPR manikin according to claim 1 wherein said disposable lung bag comprises an inflatable bag having opposed open and closed ends and providing a first chamber proximate said open end simulating the lungs of a person and providing a second chamber proximate said closed end and in fluid communication with said first chamber, said second chamber simulating the stomach of said person.

20. A disposable lung bag for being mounted to a CPR manikin for teaching cardio-pulmonary resuscitation techniques including ventilation and/or external heart massage, said manikin including a piston used in teaching said hear massage technique and said piston underlying a chest portion of said manikin, said lung bag for receiving air and being inflated during said teaching of said ventilation technique, comprising:

an inflatable bag having opposed open and closed ends, said open end for being secured to said manikin and said bag provided with an opening extending transversely therethrough for receiving a portion of said piston to position said inflatable bag under said chest portion whereby upon said inflatable bag receiving air during said ventilation said inflatable bag is inflated and imparts force to said chest portion to cause said chest portion to rise thereby facilitating teaching of said ventilation technique.

21. A disposable lung for use with a CPR manikin, comprising:

an inflatable bag having open and closed ends, said manikin including a transverse portion of reduced size for facilitating attachment of said open end of said bag to said manikin, said inflatable bag including first and second chambers in fluid communication, said first chamber proximate said open end and for simulating the lungs of a person and said second chamber proximate said closed end and for simulating the stomach of a person, and said inflatable bag provided with an opening extending transversely therethrough for facilitating the positioning of said inflatable bag with respect to a predetermined portion of said manikin.

* * * * *